Patented Dec. 19, 1933

1,940,068

UNITED STATES PATENT OFFICE 1,940,068

AZO-DYESTUFF INSOLUBLE IN WATER

Werner Zerweck and Carl Schütz, Frankfort-on-the-Main-Fechenheim, Alfred Carl, Cologne-on-the-Rhine, and Johann Rosenbach, Wiesbaden, Germany, assignors to General Aniline Works, Inc., New York, N. Y., a corporation of Delaware No Drawing. Application April 4, 1932, Serial No. 603,196, and in Germany April 15, 1931

5 Claims. (Cl. 260—95)

Our present invention relates to azodyestuffs insoluble in water.

These dyestuffs correspond probably to the general formula

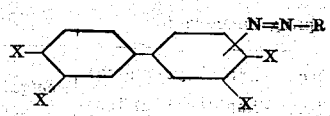

wherein one of the X's means a $NO_2$ group, a second X hydrogen, halogen or a nitro-group and the other X's mean hydrogen and R means a coupling component of the naphthalene, carbazole or acyl acetic acid series.

The new dyestuffs are distinguished by a good fastness, in some cases especially to light.

They are obtained by diazotizing an aminodiaryl containing at least one nitro-group in a meta or para position and coupling the diazo-compound with a coupling component of the aforesaid kind.

The said combination may be effected either in substance or on a substratum especially on fibers. The production of the dyestuffs on fibers may be carried out according to the ice-color method or according to one of the usual printing processes.

Since an object of the present invention is to provide dyestuffs of good fastness properties which dyestuffs are insoluble in water and alkalies it is to be understood that the aromatic nuclei of the general formulæ appearing in the appended claims contain no substituents as are known to render organic compounds soluble in water or alkalies and to tend to depreciate the fastness of the dyestuffs to alkalies. Substituents of this kind are the sulfonic acid, the carboxylic acid and the hydroxy group.

In order to further illustrate our invention the following example is given; but we wish it however to be understood that our invention is not limited to the particular products nor reacting conditions mentioned therein.

Example 50 grms. of boiled cotton yarn are treated in the following impregnating bath (a) for half an hour, well dehydrated by winding, squeezing or centrifugating and then developed for half an hour in the following dyeing bath (b):

(a) *Impregnating bath*

| | | |
|---|---|---|
| 2 grms. | of 2-(2'-hydroxy-3'-naphthoyl-amino)-naphthalene | |
| 4 cc. | of Turkey red oil of 34° Bé. | |
| 6 " | of caustic soda lye of 34° Bé. | |
| 2 " | of formaldehyde of 30% | |
| 500 " | of boiling water, made up with water to | |
| 1 liter | | |

(b) *Dyeing bath*

| | | |
|---|---|---|
| 2.14 grms. | of 4'-nitro-2-amino-diphenyl of a melting point of 158° (Chem. soc. 1927, 95) are diazotized under the addition of ice with | |
| 2.8 cc. | of hydrochloric acid of 22° Bé. and | |
| 0.75 grms. | of sodium nitrite dissolved in some water. When the diazotation is finished the mass is neutralized with about | |
| 2.5 " | of sodium acetate, an aqueous solution of | |
| 25 " | of sodium chloride is added and the whole is made up with water to | |
| 1 liter | | |

Then the dyeing goods are rinsed, soaped in the hot, rinsed again and dried.

In this manner a full red dyeing is obtained.

The dyestuff thus produced on the fiber corresponds probably to the following formula:

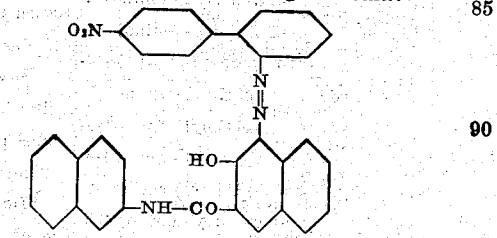

The process may be carried out in the same manner with other components usual for the production of azo-dyestuffs insoluble in water.

The following table shows the shades of some dyestuffs obtainable according to the present process:

The diazo-compound of 4'-nitro-2-amino-diphenyl yields with:

| Coupling component | Shade |
|---|---|
| 1-(2'-hydroxy - 3' - naphthoyl - amino)-benzene | Neutral red |
| 1-(2'- hydroxy-3'- naphthoyl - amino)-2-methyl-benzene | Bright scarlet |
| 1-(2'- hydroxy-3'- naphthoyl - amino)-2-methoxy-benzene | Yellowish red |
| 1-(2'- hydroxy-3'- naphthoyl - amino)-4-methoxy-benzene | Bluish red |
| 1-(2'- hydroxy-3'- naphthoyl - amino)-2.5-dimethoxy-benzene | Do. |
| 1-(2'- hydroxy-3'- naphthoyl - amino)-3-nitro-benzene | Wine-red |
| 1-(2'- hydroxy-3'- naphthoyl - amino)-4-chloro-2-methyl-benzene | Bright yellowish red |
| 1-(2'- hydroxy-3'- naphthoyl - amino)-naphthalene | Bluish red |
| 4.4'- di- (2'- hydroxy - 3'- naphthoyl-amino)-3.3'-dimethoxy-diphenyl | Bronze |
| 4.4'- di- (acetoacetyl - amino) - 3.3'-di-methyl-diphenyl | Yellow |
| 1-(2'-hydroxy-carbazole - 3'- carbonyl-amino)-2-methyl-benzene | Neutral brown |

The diazo-compound of 3-nitro-4-amino-diphenyl (Ber. d. deutsch. Chem. Ges., vol. 37, page 881) yields with:

| Coupling component | Shade |
|---|---|
| 1-(2'-hydroxy - 3'- naphthoyl - amino)-benzene | Yellowish red |
| 1-(2'- hydroxy-3'- naphthoyl - amino)-2-methoxy-benzene | Do. |
| 1-(2'- hydroxy-3'- naphthoyl - amino)-4-methoxy-benzene | Ruby-red |
| 1-(2'- hydroxy-3'- naphthoyl - amino)-2.5-dimethoxy-benzene | Bluish red |
| 1-(2'- hydroxy-3'- naphthoyl - amino)-3-nitro-benzene | Claret-red |
| 1-(2'- hydroxy-3'- naphthoyl - amino)-4-chloro-2-methyl-benzene | Bluish red |
| 4.4'- di- (2'- hydroxy - 3'- naphthoyl-amino)-3.3'-dimethoxy-diphenyl | Violet-brown |
| 4.4'- di- (acetoacetyl - amino) - 3.3'-di-methyl-diphenyl | Bright golden-orange |
| 1-(2'-hydroxy-carbazole - 3'- carbonyl-amino)-2-methyl-benzene | Violet-brown |

The diazo-compound of 4-nitro-4'-amino-diphenyl (Ber. d. deutsch. Chem. Ges., vol. 39, page 3479) yields with:

| Coupling component | Shade |
|---|---|
| 1-(2''-hydroxy-3'-naphthoyl-amino)-2-methoxy-benzene | Red |
| 1-(2'- hydroxy-3'- naphthoyl - amino)-4-chloro-2-methyl-benzene | Bluish red |
| 2-(2'-hydroxy - 3'- naphthoyl - amino)-naphthalene | Red |
| 4.4'- di-(2'- hydroxy - 3'naphthoyl-amino)-3.3'-dimethoxy-diphenyl | Brown-red |
| 4.4'-di-(aceto-acetyl - amino) - 3.3'- di-methyl-diphenyl | Greenish yellow |
| 1-(2'- hydroxy - carbazole - 3'carbonyl-amino)-4-chloro-benzene | Bright neutral brown |
| 1-(3''-hydroxy-7'8'-benzocarbazole - 2''-carbonyl-amino)-4-methoxy-benzene | Greenish-black |

The diazo-compound of 5-nitro-2-amino-diphenyl (Journ. Chem. Soc. 1928, II, 2773) yields with:

| Coupling component | Shade |
|---|---|
| 1-(2'.3'-hydroxy - naphthoyl - amino)-2-methyl-5-chloro-benzene | Bluish red |
| 1-2'.3'-hydroxy- naphthoyl - amino) - 2-methyl-4-chloro-benzene | Do. |
| 1-(2'.3'-hydroxy-naphthoyl- amino) - 3-nitro-benzene | Do. |
| 1-(2'.3'-hydroxy- naphthoyl - amino)-2-methoxy-benzene | Yellowish red |
| 1-(2'.3'-hydroxy -naphthoyl - amino)-4-methoxy-benzene | Claret red |
| 1-(2'.3'-hydroxy- naphthoyl - amino)-4-methyl-benzene | Bluish red |
| 1-(2'.3'-hydroxy- naphthoyl - amino)-2-methyl-4-methoxy-benzene | Do. |
| 1-(2'.3'-hydroxy-naphthoyl-amino)-2.5-dimethoxy-benzene | Claret red |
| 1-(2'.3'-hydroxy-naphthoyl-amino)-2.5-dimethoxy-4-chloro-benzene | Bluish red |
| 1-(2'.3'-hydroxy-naphthoyl - amino)-2-methoxy-4-chlorobenzene | Do. |
| 1-(2'.3'- hydroxy - naphthoyl - amino)-naphthalene | Claret red. |
| 2-(2'.3'- hydroxy - naphthoyl - amino)-naphthalene | Bluish red |

The diazo-compound of 4'-bromo-3-nitro-4-amino-diphenyl (Journ. Chem. Soc. 1927, 1136) yields with:

| Coupling component | Shade |
|---|---|
| 1-(2'.3' - hydroxy - naphthoyl - amino)-benzene | Bluish red |
| 1-(2'.3' - hydroxy - naphthoyl - amino)-2-methyl-benzene | Do. |
| 1-(2'.3' - hydroxy - naphthoyl - amino)-2-methoxy-benzene | Neutral red |
| 1-(2'.3' - hydroxy - naphthoyl - amino)-4-methoxy-benzene | Bluish red |
| 1-(2'.3' - hydroxy - naphthoyl - amino)-2.5-dimethoxy-benzene | Do. |
| 1-(2'.3' - hydroxy - naphthoyl - amino)-3-nitro-benzene | Claret red |
| 1-(2'.3' - hydroxy - naphthoyl - amino)-5-chloro-2-methyl-benzene | Neutral red |
| 1-(2'.3' - hydroxy - naphthoyl - amino)-naphthalene | Claret red |
| 2-(2'.3' - hydroxy - naphthoyl - amino)-naphthalene | Bluish red |
| 4.4' - di - (2'.3' - hydroxy - naphthoyl - amino)-3.3'-dimethoxy-diphenyl | Reddish brown |
| 4.4' - (aceto - acetyl - amino) - 3.3' - di-methyl-diphenyl | Bright golden orange |
| 1-(3''-hydroxy-7'.8'-benzocarbazole-2''-carbonyl-amino)-4-methoxy-3-methyl-benzene | Black |

The diazo-compound of 4'.3-dinitro-4-amino-diphenyl (Journ. Chem. Soc. 1927, 1136) yields with:

| Coupling component | Shade |
|---|---|
| 1-(2'.3' - hydroxy - naphthoyl - amino)-benzene | Neutral red |
| 1-(2'.3' - hydroxy - naphthoyl - amino)-2-methyl-benzene | Do. |
| 1-(2'.3' - hydroxy - naphthoyl - amino)-3-nitro-benzene | Bluish red |
| 1-(2'.3' - hydroxy - naphthoyl - amino)-naphthalene | Claret red |
| 4.4' - di - (2'.3' - hydroxy - naphthoyl - amino)-3.3'-dimethoxy-diphenyl | Red-brown |
| 4.4'-di- (aceto-acetyl - amino)-3.3' - di-methyl-diphenyl | Golden orange |
| 1-(3''-hydroxy-7'.8'-benzocarbazole-2''-carbonyl-amino)-4-methoxy-benzene | Greenish black |
| 1-(2'-hydroxy-carbazole - 3' - carbonyl-amino)-4-chloro-benzene | Reddish brown |
| 1-(2'.3'-hydroxy - naphthoyl - amino)-4-chloro-benzene | Full red |

The diazo-compound of 5.4'-dinitro-2-amino-diphenyl (Journ. Chem. Soc. 1927, 95) yields with:

| Coupling component | Shade |
|---|---|
| 1-(2'.3'-hydroxy - naphthoyl - amino)-benzene | Bluish red |
| 1-(2'.3'-hydroxy - naphthoyl - amino)-2-methyl-benzene | Bright yellowish red |
| 1-(2'.3'-hydroxy - naphthoyl - amino)-2-methoxy-benzene | Bright scarlet |
| 1-(2'.3'-hydroxy - naphthoyl - amino)-2.5-dimethoxy-benzene | Full red |
| 1-(2'.3'-hydroxy - naphthoyl - amino)-3-nitro-benzene | Claret red |
| 1-(2'.3' - hydroxy - naphthoyl - amino)-5-chloro-2-methyl-benzene | Bright yellowish red |
| 1-(2'.3' - hydroxy - naphthoyl - amino)-naphthalene | Bright red |
| 2-(2'.3' - hydroxy - naphthoyl - amino)-naphthalene | Do. |
| 4.4'-di - (aceto-acetyl - amino)-3.3' - di-methyl-diphenyl | Golden orange |
| 1-(2'- hydroxy - carbazole-3' - carbonyl-amino)-4-chloro-benzene | Neutral brown |
| 1-(3''-hydroxy-7'.8'-benzo-carbazole-2''-carbonyl-amino)-4-methoxy-benzene | Black |

We claim:
1. The azo-dyestuffs corresponding probably to the general formula

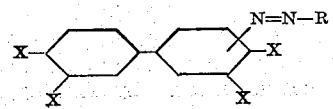

(wherein one of the X's means a NO₂ group, a second X hydrogen, halogen or a nitro-group and the other X's mean hydrogen and R means a coupling component of the naphthalene, carbazole or acyl acetic acid series) which compounds yield when produced on fibers fast dyeings and printings.

2. The azo-dyestuffs corresponding probably to the formula:

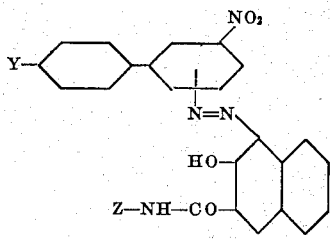

(wherein Y means bromine or nitro and Z a radical of the benzene or naphthalene series) which compounds yield when produced on fibers fast dyeings and printings.

3. The azo-dyestuff corresponding probably to the formula:

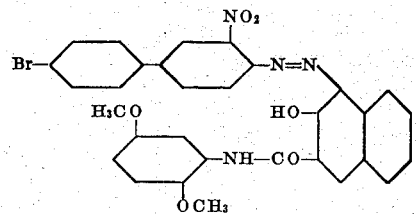

which compound yields when produced on fibers bluish red dyeings and printings of a good fastness.

4. The azo-dyestuff corresponding probably to the formula:

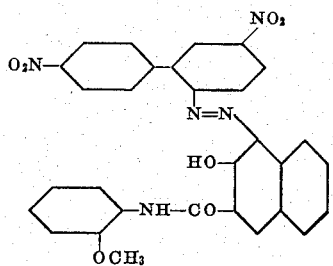

which compound yields when produced on fibers bright scarlet dyeings and printings of a good fastness.

5. The azo-dyestuff corresponding probably to the formula:

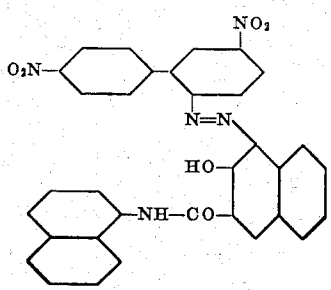

which compound yields when produced on fibers bright red dyeings and printings of a good fastness.

WERNER ZERWECK.
CARL SCHÜTZ.
ALFRED CARL.
JOHANN ROSENBACH.